June 13, 1944.   D. J. PRATESI   2,351,455
THERMOMETER READER
Filed Nov. 21, 1942

Dino J. Pratesi
INVENTOR.

BY
Victor J. Evans & Co.
ATTORNEYS

Patented June 13, 1944

2,351,455

UNITED STATES PATENT OFFICE 2,351,455

THERMOMETER READER

Dino J. Pratesi, New Bedford, Mass.

Application November 21, 1942, Serial No. 466,459

2 Claims. (Cl. 73—372)

My invention relates to thermometers, and has among its objects and advantages the provision of an improved reader whereby the usual thermometer scale calibrated in values of one or two degrees may be divided infractional parts of a degree and magnified so that an accurate reading may be taken.

Figure 1:
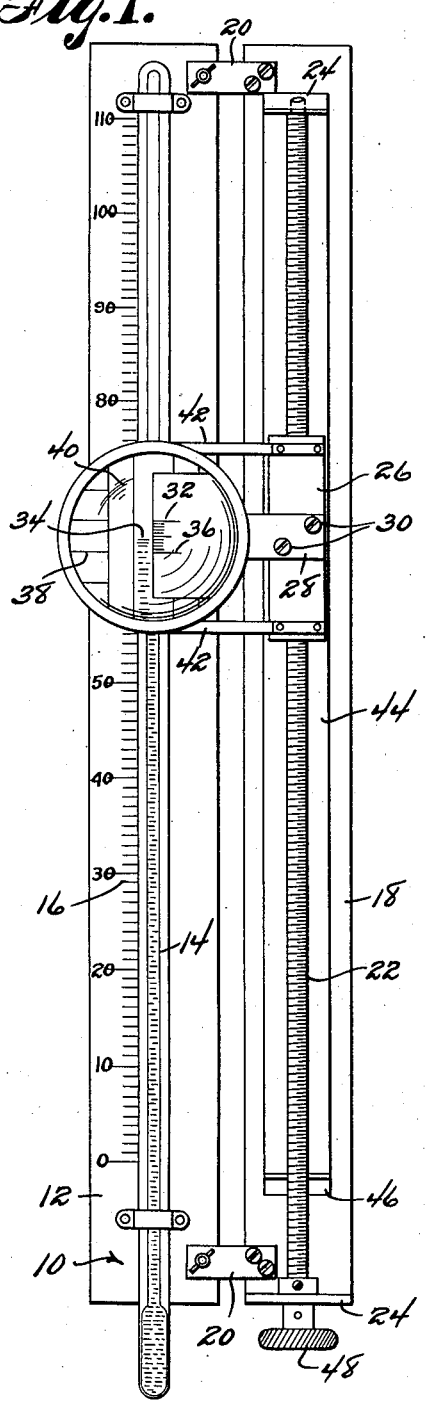
Figure 1 is a face view of a conventional thermometer showing my invention applied thereto.
Figure 2:
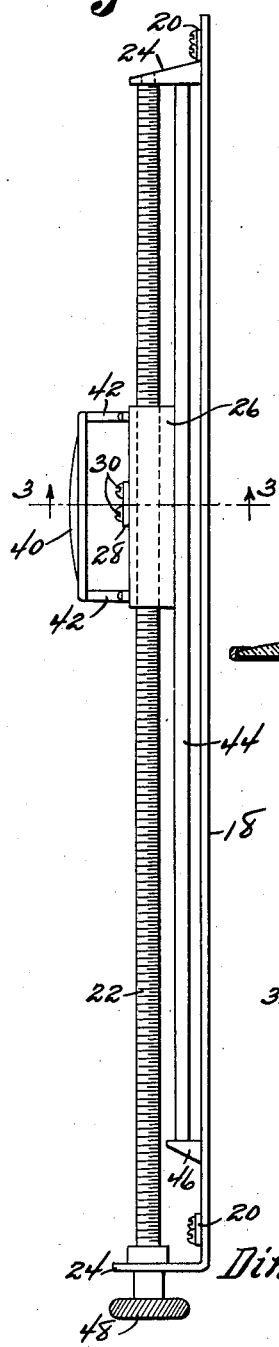
Figure 2 is a side view.
Figure 3:
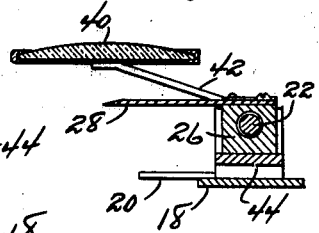
Figure 3 is a sectional view taken along the line 3—3 of Figure 2.
Figure 4:
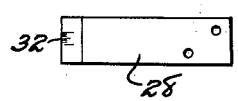
Figure 4 is a face view of the degree dividing scale.

In the embodiment selected for illustration, I make use of a conventional thermometer 10 comprising a panel or mount 12 on which is secured a thermometer stem 14. The panel 12 is provided with a scale 16 graduated in degrees.

Alongside the panel 12 is positioned a second panel 18 lying in a plane common to the panel 10. Two bars 20 have screw connections with the panels to fixedly relate the latter. A threaded shaft 22 is rotatably journaled in brackets 24 secured to the panel 18, which shaft is in parallelism with the stem 14. To the shaft 22 is threadedly connected a body 26 upon which is mounted a plate 28 by screws 30. This plate is provided with a fractional or vernier scale 32 graduated in tenths of a degree, and the scale partly overlies the stem 14 so that the liquid level 34 in the stem 14 may be read in relation to the scale 32.

In taking a reading from the scale 32, the lowermost division 36 of the scale is aligned with the first graduation line in the scale 16 underneath the level 34, as at 38, so that fractional parts of a degree above the line 38 may be read from the scale 32.

To facilitate reading fractional parts of a degree on the scale 32, a magnifying glass 40 is located above the two scales 16 and 32. This glass is mounted on brackets 42 fixedly secured to the body 26. Thus the plate 28 and the glass 40 are connected as a unit with the body 26 to move therewith when the body is moved longitudinally of the shaft 22 through rotation of the shaft.

Lying in engagement with the bottom face of the body 26 is a guide bar 44 to restrain the body from rotation but along which the body slides freely. One end of the guide bar is attached to the uppermost bracket 24 and the other end is attached to a bracket 46 on the panel 18.

A knob 48 is attached to the shaft 22 to facilitate rotation thereof. The plate 28 is detachably mounted on the body 26 so that other plates may be substituted therefor, depending upon the degree spacing of the scale 16.

Without further elaboration, the foregoing will so fully illustrate my invention, that others may, by applying current knowledge, readily adapt the same for use under various conditions of service.

I claim:

1. A reading attachment for a thermometer having its stem mounted on a panel, comprising a second panel, means securing said second panel fixedly to and in the plane of the first panel, a vernier scale arranged in a reading relation to the stem, a magnifying glass overlying the vernier scale, a body constituting a mount for said vernier scale and the magnifying glass, and a screw-threaded shaft rotatably mounted on said second panel in parallelism with said stem and threadedly connected with said body to move the body longitudinally of the stem through rotation of said shaft.

2. A reading attachment for a thermometer of the kind described in claim 1, wherein the body has a flat rear face, wherein the vernier scale is secured to the front face of the body between the ends of the latter, wherein the magnifying glass is secured to the body by brackets extending laterally and rearwardly from the magnifying glass and attached to the front face of the body at the ends of the body, and wherein the body is held against rotation by a flat guide bar secured to the second panel and contacting with the rear face of the body.

DINO J. PRATESI.